United States Patent
Tien et al.

(10) Patent No.: US 10,637,833 B2
(45) Date of Patent: Apr. 28, 2020

(54) METHOD AND SYSTEM FOR SECURE DATA SHARING

(71) Applicants: CRYPTOMILL INC., Haggatt Hall (BE); Chen Li Tien, Richmond Hill (CA); Joseph Mari Villamor Ocol, Milton (CA); Deepu Filji, Toronto (CA); Cristian Sebastian Niculescu, Toronto (CA); Ivan Canute Serrao, Toronto (CA); Christian George Batty, Scarborough (CA); Nandini Jolly, Toronto (CA)

(72) Inventors: Chen Li Tien, Richmond Hill (CA); Joseph Mari Villamor Ocol, Milton (CA); Deepu Filji, Toronto (CA); Cristian Sebastian Niculescu, Toronto (CA); Ivan Canute Serrao, Toronto (CA); Christian George Batty, Scarborough (CA); Nandini Jolly, Toronto (CA)

(73) Assignee: CRYPTOMILL INC., St. Michael (BB)

( * ) Notice: Subject to any disclaimer, the term of this patent is extended or adjusted under 35 U.S.C. 154(b) by 218 days.

(21) Appl. No.: 15/025,815

(22) PCT Filed: Sep. 30, 2014

(86) PCT No.: PCT/CA2014/050939
§ 371 (c)(1),
(2) Date: Mar. 29, 2016

(87) PCT Pub. No.: WO2015/042725
PCT Pub. Date: Apr. 2, 2015

(65) Prior Publication Data
US 2016/0241522 A1 Aug. 18, 2016

Related U.S. Application Data

(60) Provisional application No. 61/884,359, filed on Sep. 30, 2013.

(51) Int. Cl.
*H04L 29/06* (2006.01)
*G06F 21/62* (2013.01)
*H04L 9/08* (2006.01)

(52) U.S. Cl.
CPC ...... *H04L 63/0428* (2013.01); *G06F 21/6218* (2013.01); *H04L 9/0822* (2013.01);
(Continued)

(58) Field of Classification Search
CPC . G06F 21/6218; G06F 17/30011; H04L 63/10
See application file for complete search history.

(56) References Cited

U.S. PATENT DOCUMENTS 7,234,063 B1 6/2007 Baugher et al.
7,594,262 B2 9/2009 Hanzlik et al.
(Continued)

OTHER PUBLICATIONS

International Patent Application No. PCT/CA2014/050939, International Preliminary Report on Patentability dated Apr. 5, 2016.
(Continued)

*Primary Examiner* — Jason K Gee
(74) *Attorney, Agent, or Firm* — Leber IP Law; David C. Robertson (57) ABSTRACT

A method of protecting data is disclosed herein. The method comprises: encrypting a data in a protected data item using a first encryption key; and encrypting the first encryption key in the protected data item using a second encryption key that is unique to the protected data item, wherein the unique second encryption key is derived from a third encryption key (Continued)

Transparent Open 701

Opaque Protected 702 in the protected data item and to a plurality of protected data items comprising a common characteristic shared with the protected data item.

17 Claims, 7 Drawing Sheets

(52) U.S. Cl.
CPC .......... *H04L 63/061* (2013.01); *H04L 63/062* (2013.01); *G06F 2221/2127* (2013.01)

(56) References Cited

U.S. PATENT DOCUMENTS

| | | |
|---|---|---|
| 7,957,320 B2 | 6/2011 | Konig et al. |
| 2003/0152222 A1* | 8/2003 | Nakano .................. G06F 21/10 380/201 |
| 2008/0298580 A1* | 12/2008 | Suu ........................ G06F 21/10 380/42 |
| 2010/0185852 A1* | 7/2010 | Ogawa .................. G06F 21/602 713/165 |
| 2012/0072723 A1* | 3/2012 | Orsini .................. G06F 21/6209 713/165 |
| 2012/0331295 A1 | 12/2012 | Tseng et al. |

OTHER PUBLICATIONS

International Patent Application No. PCT/CA2014/050939, International Search Report and Written Opinion dated Dec. 29, 2014.

* cited by examiner

Data Header 201

| Signature 301 | Header Check 302 | Trust Boundary ID 303 | Data Unique Random Salt 304 | Encrypted DEK 305 | DEK Check 306 |

Transparent Open 701     Opaque Protected 702

FIG. 7

METHOD AND SYSTEM FOR SECURE DATA SHARING

CROSS-REFERENCE TO RELATED APPLICATIONS

This application is a National Stage Entry of International Application No. PCT/CA2014/050939, filed on Sep. 30, 2014, which claims the benefit of priority of U.S. Provisional Patent Application Ser. No. 61/884,359 titled METHOD AND SYSTEM FOR SECURE DATA SHARING filed on Sep. 30, 2013 which is hereby incorporated by reference in its entirety.

FIELD

The embodiments disclosed herein relate generally to the field of data security, and more specifically to a method of securely sharing sensitive documents, files and data between select users of computing devices.

BACKGROUND

Across various industries data security is an ever increasing concern. The protection of information is an important concern for corporations, individuals, and other legal entities. Corporations, for example, generally deal with vast amounts of sensitive information whether it be customer lists, personal information of clients, trade-secrets or other sensitive information. It is often not only important to keep such information safe and secure as it resides on internal systems but it is also be desirable to share such information between authorized persons in a safe manner. It is, therefore, desirable to provide a method and system for secure data sharing.

The above information is presented as background information only to assist with an understanding of the present disclosure. No determination has been made, and no assertion is made, as to whether any of the above might be applicable as prior art with regard to the present disclosure.

SUMMARY

In a first aspect, the present disclosure provides a method of protecting data, the method comprising: encrypting a data in a protected data item using a first encryption key; and encrypting the first encryption key in the protected data item using a second encryption key that is unique to the protected data item, wherein the unique second encryption key is derived from a third encryption key corresponding both to the protected data item and to a plurality of protected data items comprising a common characteristic shared with the protected data item.

In an embodiment, the unique second encryption key is derived from both the third encryption key and a cryptographic salt that is randomly generated from the protected data item.

In an embodiment, the data is encrypted to a payload portion of the protected data item.

In an embodiment, the first encryption key is encrypted to a header portion of the protected data item.

In various embodiments, the data comprises a file, a document, a folder, the contents of a folder, or a combination thereof.

In another aspect, the present disclosure provides a method of protecting data, the method comprising: defining a trust boundary and a corresponding trust boundary key; assigning a protected data item to the trust boundary, the protected data item comprising a randomly generated cryptographic salt; encrypting a data in the protected data item using a first encryption key; and encrypting the first encryption key in the protected data item using a second encryption key derived from the cryptographic salt and the trust boundary key for associating the encrypted data to the trust boundary.

In an embodiment, the method further comprises defining a set of users as having access to the trust boundary.

In an embodiment, the encrypted data is transparent to a user having access to the trust boundary to which the data belongs.

In an embodiment, encrypting the data further comprises: creating a copy of the data; encrypting the copy of the data in the protected data item using a first encryption key; and, replacing the original data with the encrypted copy only after encryption of the copy has been completed.

In another aspect, the present disclosure provides a system for protecting data, the system comprising: an encryption component for encrypting a data in a protected data item using a first encryption key, and for encrypting the first encryption key in the protected data item using a second encryption key that is unique to the protected data item, wherein the unique second encryption key is derived from a third encryption key corresponding both to the protected data item and to a plurality of protected data items comprising a common characteristic shared with the protected data item.

In another aspect, the present disclosure provides a system for protecting data, the system comprising: a trust boundary creator for defining a trust boundary and a corresponding trust boundary key; a trust boundary assignor for assigning a protected data item to the trust boundary, the protected data item comprising a randomly generated cryptographic salt; and, a data encryption component for encrypting a data in the protected data item using a first encryption key, and for encrypting the first encryption key in the protected data item using a second encryption key derived from the cryptographic salt and the trust boundary key for associating the encrypted data to the trust boundary.

In an embodiment, the system further comprises a trust boundary member manager and a member enroller for defining a set of users as having access to the trust boundary.

In an embodiment, the system further comprises a data converter for: creating a copy of the data; encrypting the copy of the data in the protected data item using a first encryption key; and, replacing the original data with the encrypted copy only after encryption of the copy has been completed.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Numerous details are set forth to provide an understanding of the embodiments described herein. The example embodiments may be practiced without these details. In other instances, well-known methods, procedures, and components have not been described in detail to avoid obscuring the embodiments described. The description is not to be considered as limited to the scope of the example embodiments described herein.

Introduction

Various embodiments disclosed herein provide the ability for individuals to manage and work with sensitive data, keeping that information safely out of the hands of outsiders, and yet also share it with others that they have identified as being part of a trusted group. Various embodiments are useful to individuals either working on their own, or in small-to-large organizations, in any field of endeavor.

Some embodiments of the systems and methods disclosed herein allow users to protect their data (at their discretion) encrypting it while at rest, but also ensuring that it could be securely transferred to and shared with select other individuals. In some embodiments, the "circle of sharing" is one where chosen individuals can become group members regardless of where they are located or what organization they belong to.

An attractive characteristic of some embodiments disclosed herein is their ease of use. The ease of use of these embodiments can help them be widely adopted. Some embodiments disclosed herein allow users to:

set up trust groups intuitively and simply, classify their data in a way that is simple and natural, use, copy, move or otherwise manage their data as they are currently used to doing, and participate in secured data sharing with a minimum interruption to workflow, and a minimal introduction of new concepts.

Trust Boundary Concept

Various embodiments in accordance with the present disclosure define a concept of "Trust Boundary"—a mechanism that provides discretionary data security for computer users who wish to share potentially-sensitive information with select others. In the terminology of the present disclosure, the set of people who can be trusted to keep the information confidential are considered to be "within the Trust Boundary". The sensitive information that can be exchanged by this select group, are also said to reside within the Trust Boundary. The present disclosure uses the term, "TB", as a short form for "Trust Boundary".

Some embodiments disclosed herein provide a system that allows individuals to set up and manage Trust Boundaries (TBs), as well as assign their documents, files and other data to those TBs.

Conventional Security Methods

Classifying data, securing it, and sharing it with others in an organization on a "need-to-know" basis is known in the art. However, these conventional methods have severe shortcomings for today's typical computing device user. These shortcomings include the cost and complexity of the infrastructure to management the classifications and protections, and—most importantly—the degree of the user's willingness to participate in such a security system.

Conventional methods typically involve a Public Key Infrastructure, assignment of public/private keys to individuals, processes for identifying and marking data for classification, and maintaining strict access controls on data using physical means, file-system rights, and network security techniques.

Shortcomings of Conventional Security Methods

Many users of computing devices simply do not have these resources or this expertise at hand.

Furthermore, there is a lack of willingness to use such systems. If imposed on them by their organizations, most users will put up with the interference to their daily work activities required by the security system. However, when given the opportunity of setting up and controlling their own environments, most users would simply opt to bypass the security controls, in the interest of getting their work done.

Or, put more bluntly: generally, if a user isn't forced to use a security system, the user won't use one.

Because of these shortcomings, the conventional methods do not always meet the security needs for secure data sharing amongst regular users of computing devices.

The conventional methods require a security infrastructure that is installed, organized, and maintained by information security overseers. In addition, the end-users must all be members of the same organization. Furthermore, users must be more-or-less willing participants in the mechanics of the security system, by understanding the overall security model (at a high level, at least) so that they can interact with it to set up data classes, classify files, and finally gain access to data.

The conventional methods involve too much overhead, too many workflow interruptions, and require that the user understand new concepts and develop new behaviors related to the security process.

Usage of Various Embodiments Disclosed Herein

Various embodiments disclosed herein address one or more of the above-mentioned roadblocks to adoption. Some embodiments address all of the above-mentioned roadblocks to adoption.

Some embodiments provide discretionary data security for computer users who wish to share potentially-sensitive information with select others; that is: a group of people whom can be trusted to keep the information confidential. In terminology of the present disclosure, this select group and the sensitive information that they can exchange, are said to reside within a "Trust Boundary" (or TB).

To maximize the acceptance by the user community, some embodiments provide users with improved ease-of-use regarding the setup and management of Trust Boundaries (TBs), and the assignment of their documents, files and data to those TBs.

Figure 1:
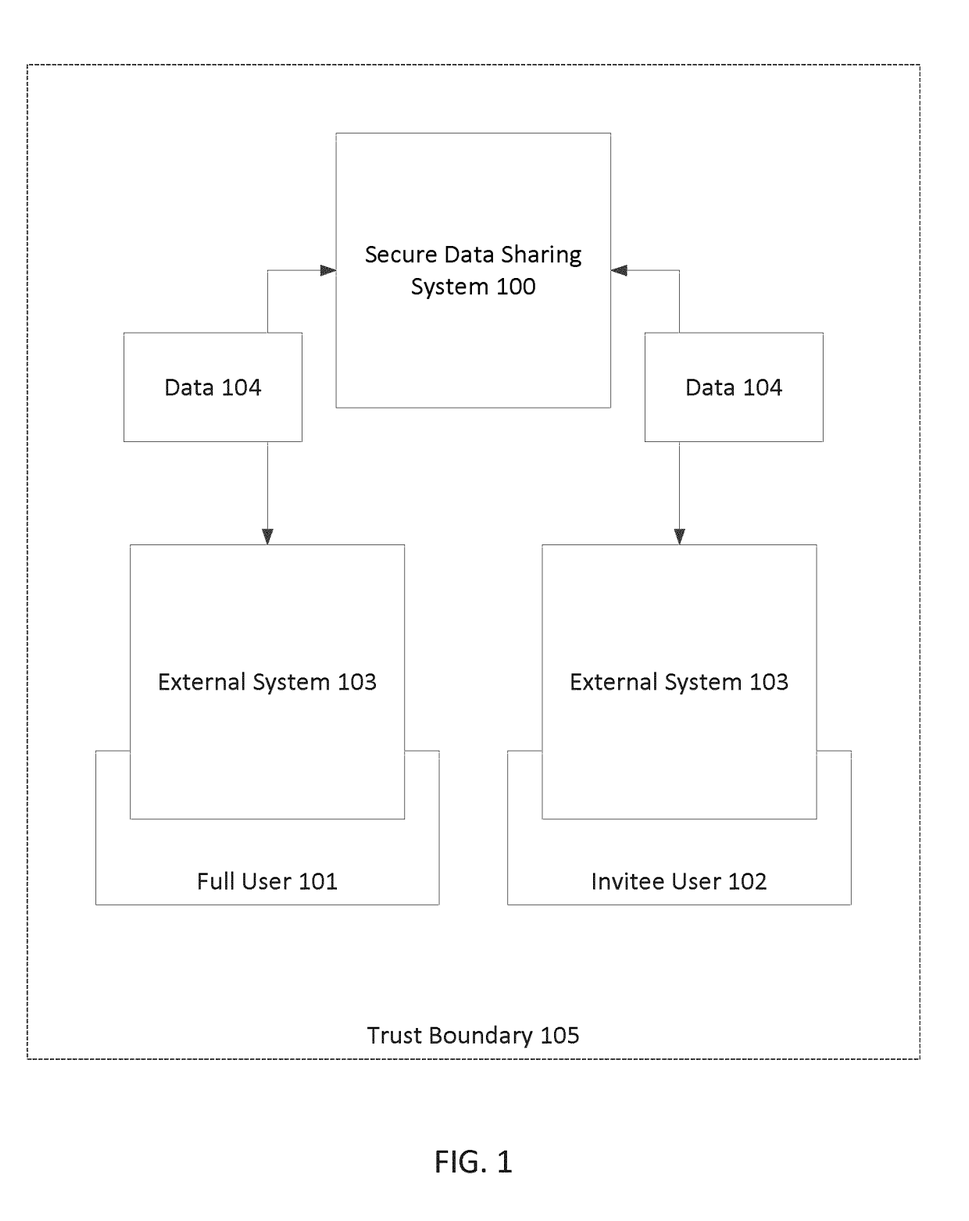
FIG. 1 is a block diagram illustrating a secure data sharing system interconnection according to an embodiment of the present disclosure.

Reference is made to FIG. 1, which is a schematic diagram illustrating the operation of a secure data sharing system 100 according to an embodiment of the present disclosure. In the example of FIG. 1, secure data sharing system 100 is connected to a Full User 101 and an Invitee User 102, via an external system 103. System 100 allows data 104 to be shared between the Full User 101 and the Invitee User 102. Accordingly, the interconnection of system 100 to Full User 101 and Invitee User 102 defines a Trust Boundary 105.

The Full User 101 can be a member of one or more Trust Boundaries 105, and thus able to use and exchange protected documents within those TBs. They are able to define Trust Boundaries 105, and invite other people to become members of their Trust Boundaries 105.

The Invitee User 102 may have limited use of the embodiments disclosed herein. In some embodiments, these users are able to participate in Trust Boundaries, but cannot create TBs on their own, nor enroll others into existing TBs.

An external system 103 includes, for example, software programs that run on a given computing device. These programs run in association with the computing device's operating system to provide transparent protection of the users' documents, files and data, which exist within the operating system environment. In some embodiments, this transparency is achieved through intimate interaction with the computing device's file or storage systems—a relationship that goes beyond typical user software/OS host coupling. Because of this intimacy, the computing device's operating system itself is considered an external system when considering the transparent data protection behavior exhibited by some of the embodiments disclosed herein.

However, while the portions of the computing device (such as user software and the OS) may comprise external systems 103, other portions of each user computing device also comprise secure data sharing system 100. Thus, in an embodiment, system 100 comprises portions of user computing devices. In an embodiment, a component of the secure data sharing system 100 is installed on each user's computing device.

It should be understood from the above discussion that FIG. 1 illustrates a system according to an embodiment of the present disclosure. However, the secure data sharing system 100 is used to represent the overall functionality of an embodiment of the present disclosure and is illustrated as a block separate from the various computing devices. However, the secure data sharing system 100 functionality is achieved, in various embodiments, by the operation of various computing devices (such as the user's computing devices) that are part of the overall interconnection of FIG. 1. In some embodiments, one or more servers may be used to achieve part of the functionality of the embodiments described herein.

One communications mechanism that enables users of the embodiments disclosed herein to enroll others into their Trust Boundaries is an inter-computing-device messaging system. An example embodiment uses e-mail for messaging. The computing device's messaging system is used as the transport to send and receive Trust Boundary enrollment data.

In an example embodiment, users of the embodiments disclosed herein can create Trust Boundaries 105 and assign individuals to be members of those TBs. Once this administrative setup is done, users can select documents and files (data 104), and folders for containing those documents and files, to be associated with a Trust Boundary 105. System 100 allows the data 104 to be protected (encrypted) and yet shareable with others in the corresponding Trust Boundary 105.

In the embodiment of FIG. 1, the system 100 can include portions of various computing devices. For example, in various embodiments, the system 100 includes two or more computing devices, where each computing device may be utilized by a different user. The computing devices can include, but are not limited to, personal computers, laptops, notebook computers, tablet computers, and smart phones. Generally, such computing devices include one or more physical memory devices, one or more processors, and input/output devices. The system 100 may also include a server, which can include, among other things, one or more processors and one or more physical memory devices.

Figure 2:
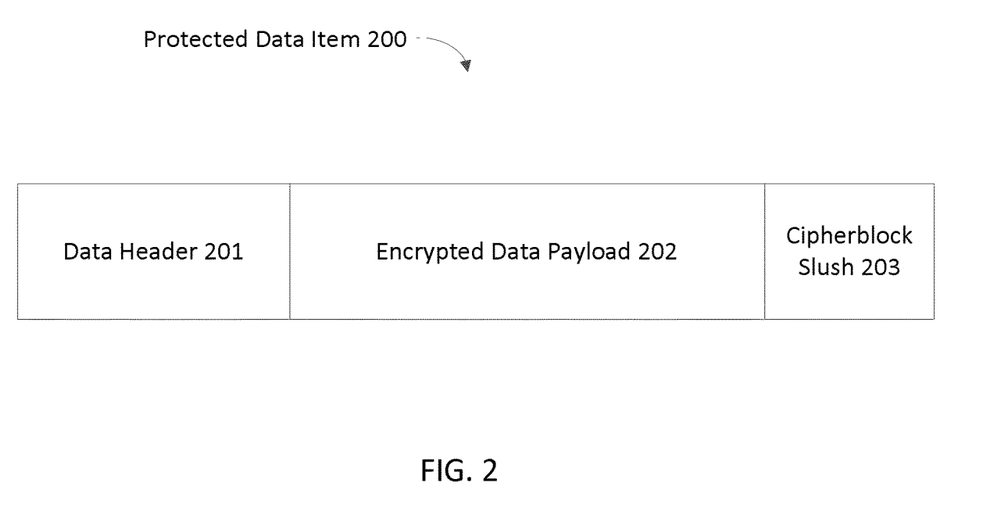
FIG. 2 is a diagram illustrating a protected data item according to an embodiment of the present disclosure.

FIG. 2 is a diagram illustrating a protected data item according to an embodiment of the present disclosure. Protected Data Item 200 comprises a Data Header 201, an Encrypted Data Payload 202, and a Cipherblock Slush 203.

The actual placement and ordering of these parts within the overall Protected Data Item 200 is not important to the overall functioning of various embodiments disclosed herein. The Data Header 201 serves to identify the data item as a Protected Data Item 200, and indicates the Trust Boundary 105 to which the Protected Data Item 200 belongs.

The Encrypted Data Payload 202 is the part of the Protected Data Item 200 that contains what the user wishes to protect. The Encrypted Data Payload contains the encrypted user data 104 that has been associated with a Trust Boundary 105.

The Cipherblock Slush 203 comprises zero or more bytes of binary zeros—as many as are needed to make the combined size of the Encrypted Data Payload 202 and Cipherblock Slush 203 a multiple of the cipherblock size (for example, 16 bytes for AES). The operation and selection of the Cipherblock Slush 203 is known in the art of cryptography.

Figure 3:
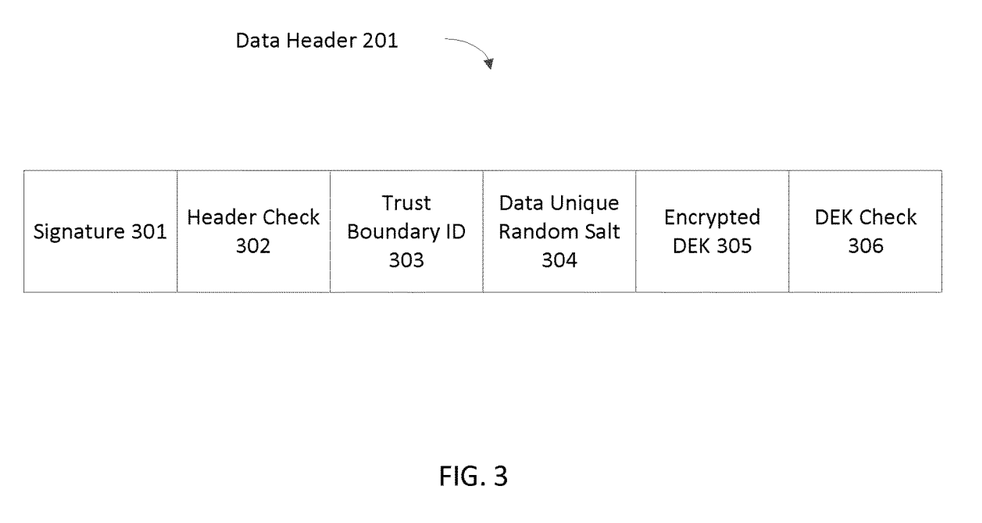
FIG. 3 is a diagram illustrating a data header according to an embodiment of the present disclosure.

FIG. 3 is a diagram illustrating an exemplary embodiment of Data Header 201 comprising a Signature 301, a Header Check 302, a Trust Boundary ID 303, a Data Unique Random Salt 304, a Data Encryption Key (DEK) 305, and a DEK Check 306.

Both the Encrypted Data Payload 202 and the Cipherblock Slush 203 parts, taken as a whole, are encrypted using the Data Encryption Key (DEK) 305. In an embodiment, the DEK 305 is a random number value, generated when the Protected Data Item 200 is first created.

The actual placement and ordering of these parts within Data Header 201 is not important to the overall functioning of various embodiments disclosed herein.

The Signature 301 comprises a distinctive sequence of bytes to identify that the Data Header 201 is in fact a data header of the Protected Data Item 200.

The integrity of the Data Header 201 structure can be verified by calculating the keyed-hash message authentication code (HMAC) of the header structure, and comparing it to the value of the Header Check 302. In an embodiment, the calculation is performed with the value of the Header Check 302 zeroed out.

The Trust Boundary ID 303 associates the Protected Data Item 200 to a predefined Trust Boundary 105 so that the appropriate access control and Trust Boundary key lookup can be done, when attempting to decrypt the data item.

The Data Unique Random Salt 304 contains random numbers, generated when the Data Header 201 is created. These random numbers, which are essentially unique for each Protected Data Item 200, are used as a cryptographic salt. The salt, when combined with the Trust Boundary key, allows for the derivation of a Key Encryption Key (KEK). In an embodiment, the KEK is used to encrypt the DEK 305 as an encrypted DEK (eDEK) 305, which is then stored in the Data Header 201.

The DEK Check 306 contains the encrypted secure hash (SHA) of the eDEK 305. This secure hash is encrypted using the KEK described above.

Since the KEK is derived from the salt and the Trust Boundary key (TBK), and the TBK is uniquely associated to a Trust Boundary 105, access to the data protected in the Protected Data Item 200 is ultimately controlled by the data's association with the Trust Boundary 105. In this way, a user's experience in accessing the protected data is transparent and non-interruptive.

The operation of system 100 for generating the Protected Data Item 200 will now be described.

Figure 4:
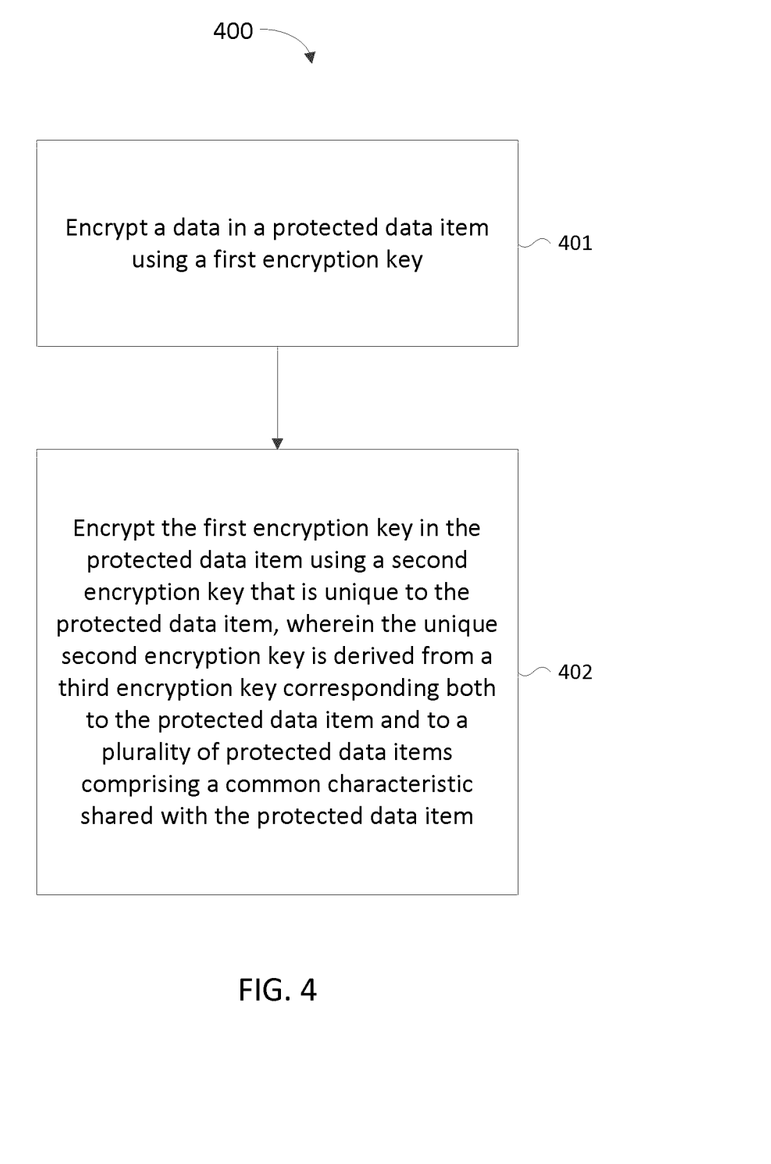
FIG. 4 is a flow-chart diagram illustrating a method of protecting data according to embodiment of the present disclosure.

FIG. 4 is a flow-chart diagram illustrating a method 400 for protecting data according to embodiment of the present disclosure.

Method 400 comprises, at 401, encrypting the data 104 in a Protected Data Item 200 using a first encryption key. At 402, method 400 encrypts the first encryption key in the Protected Data Item 200 using a second encryption key that is unique to the Protected Data Item 200. The unique second encryption key is derived from a third encryption key that corresponds both to the Protected Data Item 200 and to a plurality of other protected data items comprising a common characteristic shared with the Protected Data Item.

In an embodiment, this common characteristic is the Trust Boundary 105 to which both the Protected Data Item 200 and the other protected data items of the plurality are all assigned. Thus, according to method 400, access to the data protected in the Protected Data Item 200 is ultimately controlled by the data's association with a Trust Boundary 105. In this way, a user's experience in accessing the protected data is transparent and non-interruptive.

In a further embodiment, the first encryption key is the Data Encryption Key 305, the second encryption key is the KEK, and the third encryption key is the TBK.

Figure 5:
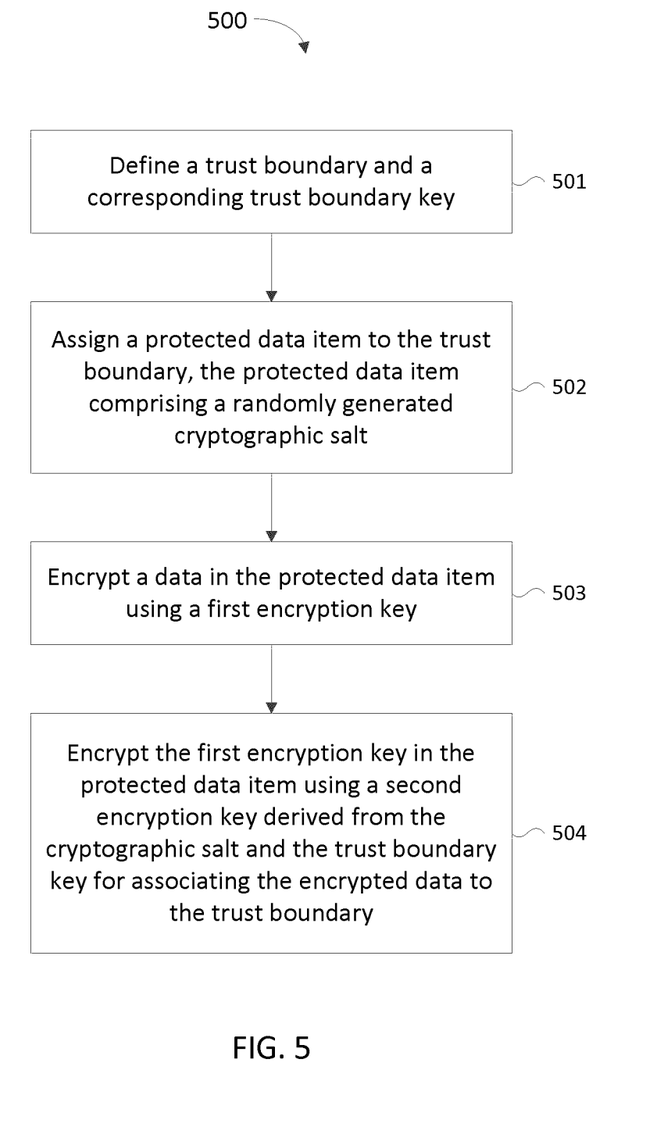
FIG. 5 is a flow-chart diagram illustrating a method of protecting data according to embodiment of the present disclosure.

FIG. 5 is a flow-chart diagram illustrating a method 500 of protecting data according to another embodiment of the present disclosure. In an embodiment, the system 100 performs the steps of method 500. At 501, the system 100 defines a trust boundary 105 and a corresponding trust boundary key. At 502, the system 100 assigns a Protected Data Item 200 to the trust boundary 105, the Protected Data Item 200 comprising a randomly generated cryptographic salt 304. At 503, system 100 encrypts a data 104 in the Protected Data Item 200 using a first encryption key. At 504, system 100 encrypts the first encryption key in the Protected Data Item 200 using a second encryption key derived from the cryptographic salt 304 and the trust boundary key for associating the encrypted data 104 to the trust boundary 105.

In an embodiment, the first encryption key is the Data Encryption Key 305, the second encryption key is the KEK, and the third encryption key is the TBK.

Key Management

To enable users to share encrypted contents under the same Trust Boundary 105, various embodiments keep cryptographic material accessible in relation to each Trust Boundary. In various embodiments, this information is strongly protected with a key management system that is both scalable and lightweight.

An example embodiment of such a key management is the Data Protection API (DPAPI) available for Microsoft Windows operating systems. In an embodiment, DPAPI is used to store the TBK in ciphertext on each user computing device of the external system 103.

Key Exchange with Invited Trust Boundary Members

Key exchange with other members is carried out using a key exchange method. According to an embodiment of the present disclosure, the key exchange method is the Microsoft implementation of the Diffie-Hellman method. It allows for a no-prior-knowledge secure key exchange. It is used to setup an encrypted channel between the Full User 101 and the Invitee User 102. Each inviter-to-invitee pair will have separate channel keys (even for the same TC 105).

Figure 6:
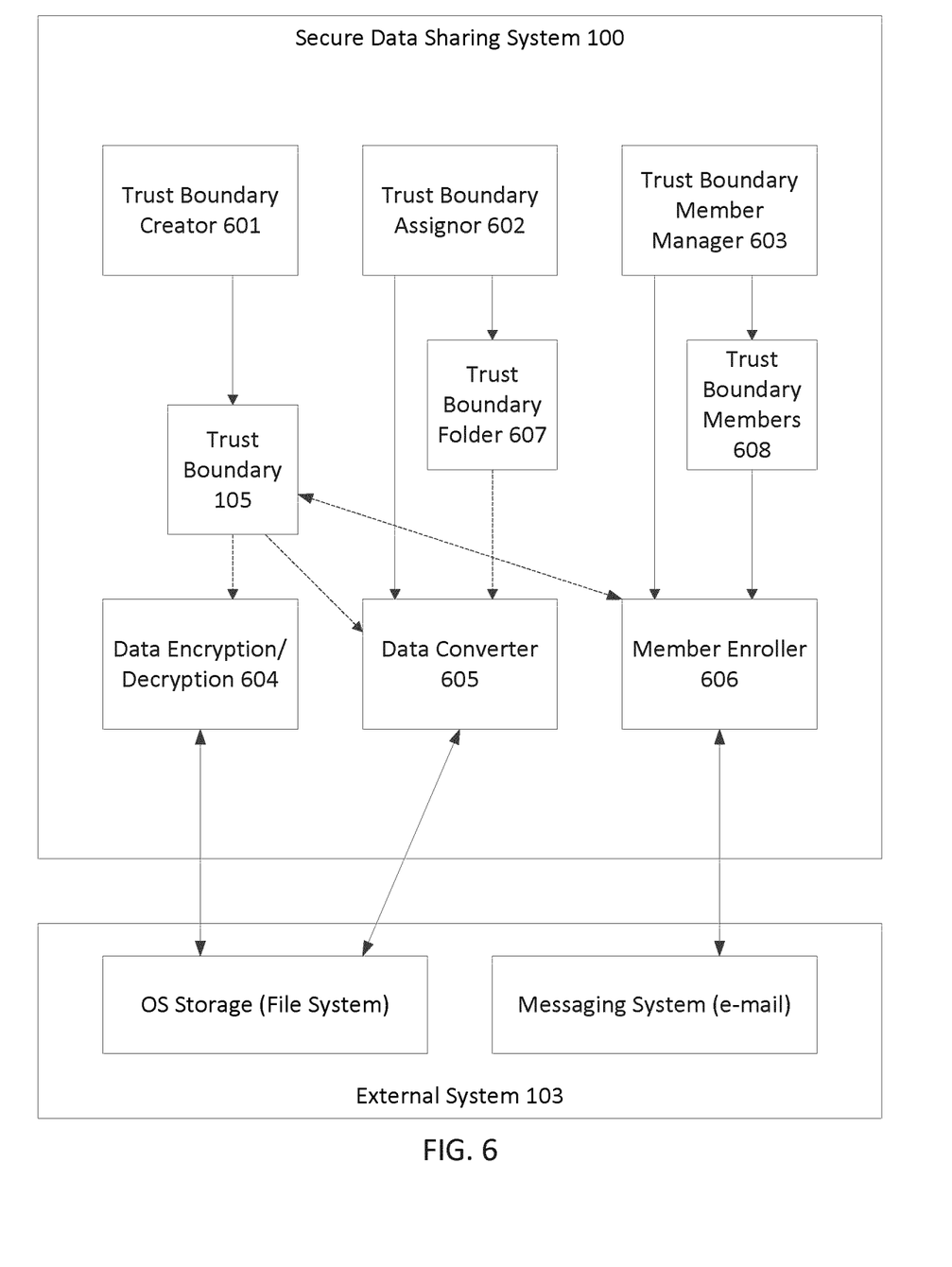
FIG. 6 is a block diagram illustrating the secure data sharing system according to embodiment of the present disclosure.

FIG. 6 is a block diagram illustrating the secure data sharing system according to embodiment of the present disclosure.

System 100 comprises a Trust Boundary Creator 601, a Trust Boundary Assignor 602, a Trust Boundary Member Manager 603, a Data Encryption and Decryption 604, a Data Converter 605, and a Member Enroller 606.

The Trust Boundary Creator 601, the Trust Boundary Assignor 602, and the Trust Boundary Member Manager 603 comprise a user interface layer of the system 100.

The Data Encryption and Decryption 604, the Data Converter 605, and the Member Enroller 606 comprise the background services layer of the system 100.

The Trust Boundary Creator 601 is responsible for letting a user create and delete Trust Boundaries 105. The Trust Boundary Creator 601 allows a user to define a new Trust Boundary 105 representing a set of information and group of people amongst whom the information can be shared. The Trust Boundary Creator 601 names and stores the Trust Boundary 105 in the Trust Boundary persistent store of the system 100.

The Trust Boundary Assignor 602 is responsible for creating new Trust Boundary folders 607, and associating existing folders 607 with Trust Boundaries 105. In an embodiment, the Trust Boundary Assignor 602 allows a user to organize information pertaining to a Trust Boundary using a TB folder 607, by simply creating a Windows folder to house documents and files associated with the Trust Boundary 105.

In a further embodiment, the Trust Boundary Assignor 602 also allows a user to create a new document or file within a Trust Boundary folder 607. The file can be created either directly, as with an application saving its output into a file in the TB Folder 607. Or, the file can be created as a result of a Copy or Move operation, as with a simple file-level copy-and-paste (or drag-and-drop) operation in Windows Explorer, with the TB Folder 607 being the target location of the operation.

In yet a further embodiment, the Trust Boundary Assignor 602 allows a user to add an additional folder to an existing Trust Boundary 105. In this case, the newly-identified folder is added to the Trust Boundary Folder persistent store. Any existing content (files, files in subfolders) contained within the new Trust Boundary Folder 607 are submitted to a file conversion process, so that they ultimately end up being protected (encrypted) under the associated Trust Boundary 105.

In another embodiment, the Trust Boundary Assignor 602 allows a user to decide that a particular document (or file) is no longer to be associated with its current Trust Boundary 105. The file is then converted to be unprotected (decrypted).

The Trust Boundary Member Manager 603 manages the membership of trust boundaries by for example, adding and removing members 608 of trust boundaries 105. In an embodiment, the Trust Boundary Member Manager 603 allows a user to specify a particular individual to become a member 608 of a Trust Boundary 105. The individual's particulars are saved in the Trust Boundary Member persistent store.

Because people work with different data, and with different people under different situations, various embodiments of the Trust Boundary member Manager 603 enable a user to create, and be a member of, different TBs. As a result, a user can work with multiple, potentially dozens (or even hundreds) of different TBs.

In other embodiments, TBs can be created automatically for a given user. Similarly, other program services may inspect user documents, files or data, and determine which TBs should be used to protect that data. Furthermore, program services may elect to automatically invite members to a TB on behalf of the user, based on user, document or TB characteristics. In some embodiments, all of these actions can be initiated, for example, without involvement of the user.

The enrollment of other people as Trust Boundary members 608 takes place through a series of message-based exchanges. An important component of each message in the exchange is a data token containing cryptographic information which enables a secure "key exchange", which enables the distributed protection solution. Member Enroller 606 connects the Trust Boundary Member Manager 603 to an external system 103, such as e-mail in order to provide the Trust Boundary Member Manager 603 with a means of performing the key exchange for adding Trust Boundary member 608 to a Trust Boundary 105.

Data Encryption/Decryption 604 uses a filed-based approach to provide seamless file access and transparency. To meet the need for transparent data classification, Data Encryption/Decryption protects data 104 at the file level. That is, the target objects of encryption are files created and/or stored in the operating system's file system as part of external system 103. With granularity at the file-level, a given file may be either protected, or not. If protected, a file is encrypted in its entirety, with that encryption tied to a particular Trust Boundary 105. In the terminology of the present disclosure, the file "belongs" in that TB 105.

By using file-level granularity, system 100 exploits file-oriented aspects of the user's operating environment to perform classification. In many operating systems, users are aware of files—they can see them, they can drag and drop them, create them, delete them. Hence, there are no new concepts for the user to understand, in terms of identifying the items of data that will be protected.

An example embodiment in accordance with the present disclosure uses folder containment as a means for automatic classification. Once a folder is identified as being associated with a TB 105, all files which end up in that TB folder 607 become protected for that TB 105. To do this, Data Encryption/Decryption 604 enforces a rule to the effect: "Anything being stored in Folder X will be classified as being part of Trust Boundary Y." This provides a simple easy-to-understand method of classification.

Data Encryption/Decryption 604 also encrypts files deemed to be sensitive when they are at rest on the computing device's storage. So that there are no extra steps, delays, or interruptions to normal use, this encryption (and any subsequent decryption) is performed "on-the-fly". This is also known as "transparent encryption/decryption"—emphasizing that the user is not aware that the data transformation (plaintext to ciphertext, or ciphertext to plaintext) is happening. This is achieved by encrypting protected files as they are written, and decrypting them as they are read. In various embodiments, this transparent encryption and decryption takes place, so long as the protected data is considered to be "in use" by a legitimate user, and not merely being moved around, or copied as an opaque, otherwise meaningless, stream of bytes.

To achieve transparent file encryption/decryption in the context of the computing device's operating system, it is normally necessary to implement the Data Encryption/Decryption 604 as part of the operating system. An exemplary embodiment of Data Encryption/Decryption 604 runs code at the file system level, using a file system filter driver. In this case, the filter driver is the element which, when so directed, transforms the file contents (by encrypting and decrypting) as they are transferred to and from storage. The filter driver is a software component that is active during the processing of file control and file input/output primitive commands by the operating system. As a file filter, this software has the ability to monitor what file operations are being executed, and to change the parameters associated with those operations.

Further to the goal of transparency, some embodiments of the Data Encryption/Decryption 604 perform an "in-place bulk encryption" of select existing, non-encrypted data, transforming them into protected data. In an exemplary embodiment, once a user has identified that a particular file system folder shall be associated with a TB 105, the Data Encryption/Decryption 604 will convert all the files contained in that TB Folder 607 to be protected by the TB 105.

Since this is a process that cannot be done completely transparently under all circumstances, the user will in some cases be able to detect that their data is being transformed. This is because it takes measurable, real time (minutes or more) for the folder contents to be encrypted. In a further embodiment, this potentially lengthy conversion is made visible to the end-user due to the security implications; i.e.: during the conversion period, some of the files are protected, and some of them are not protected yet.

The bulk encryption conversion is interruptible. User-initiated events (shutting down the PC) as well as surprise events (loss of power, drive unplugged) are handled by the Data Encryption/Decryption 604. This extends down to the file itself. It is possible for a file to be partly encrypted, and yet still useable, movable, or copyable by various embodiments disclosed herein.

The Data Converter 605 provides a file conversion process by which an unprotected existing file becomes protected. In various embodiments, file conversion is done on-the-fly or offline or as a hybrid. In some embodiments, the conversion process is reentrant and safe to interrupt, including, but not limited to, interruptions caused by power failure. In some embodiments, no data is lost in any situation except storage media failure.

A further embodiment of the Data Converter 605 allows system 100 to offload file conversions to a user-space service which in turn can recursively traverse a tree of files and folders and convert each individual file. Each file is converted by being copied to a temporary encrypted file. The encryption itself is done by the system-level filter which will transparently encrypt the new temporary file as it is being written to. At the end of the file conversion the original file is replaced with the temporary encrypted copy by the user-space service. The Data Converter 605 can support converting multiple files at the same time as long as they reside in different folders.

Figure 7:
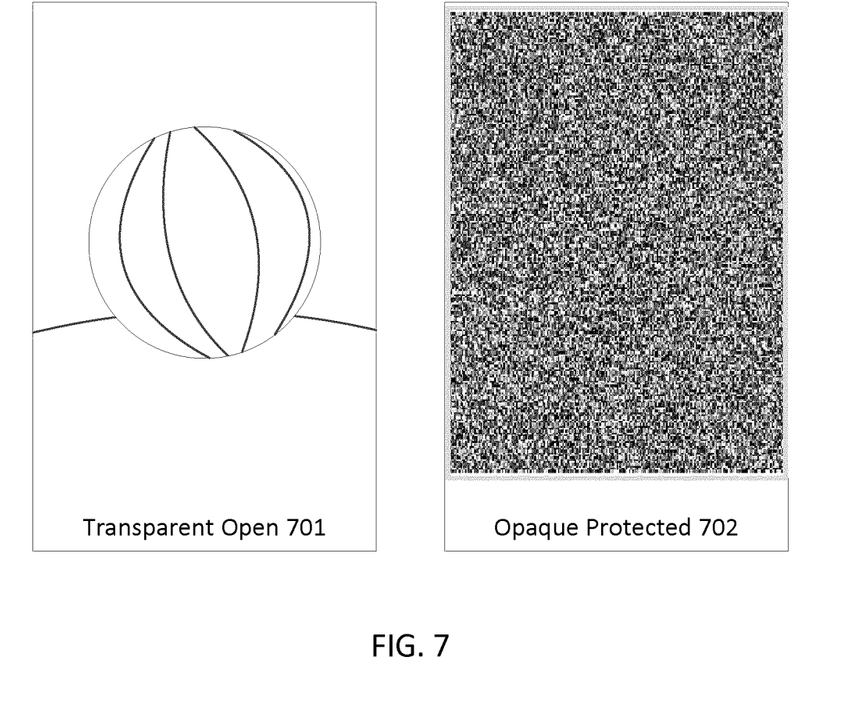
FIG. 7 is a diagram illustrating a dual view of data protected according to an embodiment of the present disclosure.

According to an embodiment of the present disclosure, system 100 additionally provides transparent protection by presenting dual views of protected data. The dual view comprises a Transparent Open view and an Opaque Protected view The Transparent Open view presents data in the form that is expected by the user or by viewing/editing/processing applications on the computing device. In this view, the data is available in plaintext, and has no data protection header. By contrast, the Opaque Protected view presents encrypted data, complete with the data protection header.

Various embodiments described herein provide the Transparent Open view when allowing a user to access their data for viewing, editing and processing. To provide this view, system 100 transforms the underlying data without a human-perceptible intervening decryption step.

However, when the computing device conditions indicate that protected data are being moved or copied out of the computing device, various embodiments will instead present the Opaque Protected view of the protected data, so that the underlying encrypted stream is all that is available.

FIG. 7 is a diagram of a dual view of data protected according to an embodiment of the present disclosure. FIG. 7 shows a dual view of exemplary image data. The protected image data depicts a ball. Image 701 shows a Transparent Open view of the ball image. According to embodiments of the present disclosure, image 701 is shown when a Trust Boundary member 608 corresponding to the Trust Boundary 105 of the protected data transparently access the protected image data on a computing device.

Image 702 shows an exemplary Opaque Protected view of the protected data. According to embodiments of the present disclosure, image 702 is shown when a user that is not a Trust Boundary member 608 corresponding to the Trust Boundary 105 of the protected data transparently access the protected image data on a computing device.

In one example embodiment, the decision to present the Opaque Protected view is made based on what software program is currently making access to the data. Based on a black list of known data-export programs, maintained in the system 100, the Opaque Protected view is presented when those programs are running. As an example, a particular email client program ("dogmail.exe") might be included in the black list. When a user of that email client program elects to attach a protected file into an email message, the email client will only see files in Opaque Protected form. When the email client inserts the file into the email buffer, it is the encrypted content, complete with Protected Data Header that is inserted. The email buffer is then transmitted to the mail server, with the attachment encrypted.

In various embodiments, the black list is periodically updated. Some embodiments utilize white lists, which may also be periodically updated. Some embodiments, utilize a combination of black lists and white lists.

To facilitate access to Trust Boundaries, in various embodiments, a configuration of the current Trust Boundaries is persistently stored for each user, either on the local storage or remotely. In an example embodiment, the configuration storage uses SQLite to store associations between users and TBs for a computing device.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of protecting data, the method comprising:
encrypting a data in a protected data item using a first encryption key, the protected data item being associated with a trust boundary, where one or more other protection data items may also be associated with the trust boundary, the data encrypted in the protected data item being accessible to a defined set of users associated with the trust boundary by using a third encryption key and being inaccessible to users not associated with the trust boundary, the third encryption key being uniquely associated with the trust boundary; and
encrypting the first encryption key in the protected data item using a second encryption key that is unique to the protected data item,
wherein the unique second encryption key is derived from the third encryption key, and prior to encrypting the first encryption key, receiving the third encryption key at a computing device, associated with a user in the defined set of users associated with the trust boundary, from another computing device.

2. The method of claim 1, wherein the unique second encryption key is derived from both the third encryption key and a cryptographic salt that is randomly generated from the protected data item.

3. The method of claim 1, wherein the data is encrypted to a payload portion of the protected data item.

4. The method of claim 1, wherein the first encryption key is encrypted to a header portion of the protected data item.

5. The method of claim 1, wherein the data comprises a file.

6. The method of claim 1, wherein the data comprises a document.

7. The method of claim 1, wherein the data comprises a folder.

8. The method of claim 7, wherein the data further comprises the contents of the folder.

9. The method of claim 1, wherein the data comprises files, documents, or folders.

10. A system for protecting data, the system comprising:
a computer processor in combination with an encryption component for encrypting a data in a protected data item using a first encryption key, the protected data item being associated with a trust boundary, where one or more other protection data items may also be associated with the trust boundary, the data encrypted in the protected data item being accessible to a defined set of users associated with the trust boundary by using a third encryption key and being inaccessible to users not associated with the trust boundary, the third encryption key being uniquely associated with the trust boundary, and the processor and encryption component for encrypting the first encryption key in the protected data item using a second encryption key that is unique to the protected data item, wherein the unique second encryption key is derived from the third encryption key, and a computing device, associated with a user in the defined set of users associated with the trust boundary, comprises the computer processor, and the computer processor is configured to receive from another computing device, prior to encrypting the first encryption key, the third encryption key.

11. The system of claim 10, wherein the unique second encryption key is derived from both the third encryption key and a cryptographic salt that is randomly generated from the protected data item.

12. The system of claim 10, wherein the data is encrypted to a payload portion of the protected data item.

13. The system of claim 10, wherein the data comprises a file.

14. The system of claim 10, wherein the data comprises a document.

15. The system of claim 10, wherein the data comprises a folder.

16. The system of claim 13, wherein the data further comprises the contents of the folder.

17. The system of claim 10, wherein the data comprises files, documents, or folders.

* * * * *